(12) United States Patent
Thomsen et al.

(10) Patent No.: US 7,135,425 B2
(45) Date of Patent: *Nov. 14, 2006

(54) GREY GLASS COMPOSITION

(75) Inventors: Scott V. Thomsen, Milford, MI (US); Richard Hulme, Rochester Hills, MI (US); Ksenia A. Landa, Grosse Ile, MI (US); Leonld Landa, Grosse Ile, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 274 days.

This patent is subject to a terminal disclaimer.

(21) Appl. No.: 10/318,358

(22) Filed: Dec. 13, 2002

(65) Prior Publication Data

US 2004/0116271 A1 Jun. 17, 2004

(51) Int. Cl.
*C03C 3/087* (2006.01)

(52) U.S. Cl. .............................. 501/64; 501/70; 501/71

(58) Field of Classification Search .................. 501/64, 501/70, 71
See application file for complete search history.

(56) References Cited

U.S. PATENT DOCUMENTS

| | | | |
|---|---|---|---|
| 3,723,142 A | 3/1973 | Kato et al. | |
| 5,023,210 A | 6/1991 | Krumwiede et al. | |
| 5,214,008 A | 5/1993 | Beckwith et al. | |
| 5,264,400 A | 11/1993 | Nakaguchi et al. | |
| 5,308,805 A | 5/1994 | Baker et al. | |
| 5,318,931 A * | 6/1994 | Nakaguchi et al. ............ 501/64 |
| 5,346,867 A | 9/1994 | Jones et al. | |
| 5,364,820 A | 11/1994 | Morimoto et al. | |
| 5,411,922 A | 5/1995 | Jones | |
| 5,569,630 A | 10/1996 | Landa et al. | |
| 5,656,560 A | 8/1997 | Stotzel et al. | |
| 5,932,502 A | 8/1999 | Longobardo et al. | |
| 6,080,695 A | 6/2000 | Scheffler-Hudlet et al. | |
| 6,103,650 A | 8/2000 | Krumwiede | |
| 6,114,264 A | 9/2000 | Krumwiede et al. | |
| 6,235,666 B1 | 5/2001 | Cochran et al. | |
| 6,436,860 B1 | 8/2002 | Seto et al. | |
| 6,498,118 B1 * | 12/2002 | Landa et al. .................. 501/64 |
| 6,521,558 B1 * | 2/2003 | Landa et al. .................. 501/64 |
| 6,573,207 B1 * | 6/2003 | Landa et al. .................. 501/64 |
| 6,610,622 B1 * | 8/2003 | Landa et al. .................. 501/64 |
| 6,716,780 B1 * | 4/2004 | Landa et al. .................. 501/64 |
| 2001/0034295 A1 * | 10/2001 | Seto et al. ..................... 501/71 |
| 2004/0077479 A1 * | 4/2004 | Coster et al. ................. 501/71 |
| 2004/0102304 A1 * | 5/2004 | Boulos et al. ................ 501/70 |

FOREIGN PATENT DOCUMENTS

| | | |
|---|---|---|
| DE | 196 36 300 | 3/1997 |
| EP | 0 482 535 | 4/1992 |
| EP | 0 811 581 | 9/2002 |
| JP | 04280834 A * | 10/1992 |
| JP | 2002293568 A * | 10/2002 |
| WO | WO 00/76928 | 12/2000 |
| WO | WO 02/059052 | 8/2002 |
| WO | WO 02/081395 | 10/2002 |

* cited by examiner

*Primary Examiner*—David Sample
(74) *Attorney, Agent, or Firm*—Nixon & Vanderhye P.C.

(57) ABSTRACT

A grey glass composition employing as its colorant portion at least iron ($Fe_2O_3$/FeO), cobalt and possibly erbium oxide (e.g., $Er_2O_3$) is provided. The glass enables high visible transmission, and satisfactory IR absorption, while at the same time achieving desired grey color. In certain example embodiments, the colorant portion includes:

| | |
|---|---|
| total iron (expressed as $Fe_2O_3$): | <=0.35% |
| erbium oxide (e.g., $Er_2O_3$): | 0 to 0.3% |
| selenium (Se): | <=15 ppm |
| cobalt oxide (e.g., $Co_3O_4$): | 5 to 60 ppm |
| glass redox: | >=0.35. |

In other example embodiments, the glass may include higher total iron and/or a lower minimum redox.

47 Claims, No Drawings

GREY GLASS COMPOSITION

This invention relates to grey glass compositions and methods of making the same. More particularly, this invention relates to grey glass compositions which are capable of achieving high light transmittance in the visible range and acceptable solar properties (e.g., IR reflectance/absorption) while using a low amount of total iron. Such glass compositions are useful, for example and without limitation, in automotive windows (e.g., windshields, sidelites, backlites and sunroofs) and in architectural/residential window applications.

BACKGROUND OF THE INVENTION

The automotive industry, for a number of years, has desired glass having grey color (sometimes called "neutral grey") for automotive window applications. At the same time, it is also desirable for transmission in the UV (ultraviolet) and/or IR (infrared) ranges of the light spectrum to be minimized. Moreover, certain Governmental regulations in the automotive industry have been known to require that visible light transmittance be at least 70% in certain vehicular windows when provided by the original equipment manufacturer of the vehicle (e.g. GM, Ford, Chrysler etc.) in the U.S.A. While a visible transmittance of 70% or higher is not always required, it is safe to say that high visible transmittance (e.g., 65% or higher) in general is often desired. Accordingly, there exists a need for a glass which achieves high visible transmittance as well as adequate blocking of IR and/or UV rays.

A glass window or other glass article is said to have the desirable color "grey" when it has a dominant wavelength of from 435 nm to 570 nm (this dominant wavelength range defines the color "grey" herein). Moreover, grey glass preferably has an excitation purity (Pe) of less than about 4.5%.

While glass having "grey" color is often desirable, as explained above there sometimes also exists a need or desire to achieve certain levels of light transmission defined conventionally by:

Lta as visible light transmission,
UV as ultraviolet light transmission, and
IR as infrared light transmission.

Glass thickness ranges of from about 1–6 mm, more preferably from about 3–4 mm, are typically used when measuring the aforesaid characteristics. These thickness ranges are generally recognized as conventional thicknesses for glass sheets made by the float glass process, as well as recognized thickness ranges in the automotive industry.

Classically formulated grey glasses, such as architectural, often include low levels of iron (i.e., less than 0.4% total iron) along with cobalt and nickel oxides. Unfortunately, while this type of glass may achieve satisfactory coloration in certain instances, it typically suffers from undesirable solar characteristics (e.g., UV and/or IR blockage).

Certain known green solar control float glasses are formulated so as to achieve desirable solar characteristics due in large part to their use of large quantities of total iron (e.g., 0.60 to 0.84% total iron). Unfortunately, the green coloration of such glasses does not always harmonize well with certain exterior automotive paints and sometimes affects vehicle interiors when viewed through the glass, and such large amounts of iron are not always desirable for glass processing.

U.S. Pat. No. 6,235,666 discloses a grey glass composition capable of achieving good solar performance characteristics, including the desirable color grey. In particular, U.S. Pat. No. 6,235,666 discloses a grey glass with a colorant portion including 0.5–0.8% total iron (expressed as $Fe_2O_3$), 0.5–3.0% $Er_2O_3$, and 0.0–1.0% $TiO_2$. While this is an excellent glass, it is sometimes undesirable in that it requires much of the very expensive erbium oxide ($Er_2O_3$). Rather large amounts of total iron (expressed as $Fe_2O_3$) are also required in many instances. Thus, there exists a need in the art for a grey glass which can achieve desired grey color in combination with acceptable solar performance properties, without the need for too much total iron and/or erbium.

WO 02/059052 discloses a grey glass including from about 0.35 to 0.5% total iron and from about 0.5 to 1.2% erbium. Again, erbium is very expensive and such large amounts thereof are not always desired. As explained above, there exists a need in the art for a grey glass which can achieve desired grey color in combination with acceptable solar performance properties, without the need for too much erbium.

In view of the above, it is apparent that there exists a need in the art for a new glass composition which overcomes the above problems while achieving one or more of desired grey color and desired solar management property(ies) of the particular industry in which it is to be used.

SUMMARY OF THE INVENTION

An object of one example embodiment of this invention is to provide a grey glass (i.e., having a dominant wavelength of from 435 nm to 570 nm) with acceptable solar performance characteristics, where the glass includes a colorant portion having no more than 0.3% erbium oxide ($Er_2O_3$), and no more than 0.35% total iron (expressed as $Fe_2O_3$). In certain example embodiments, the glass may include from 0.05 to 0.29% total iron, and from 0.05 to 0.25% erbium oxide.

An object of another example embodiment of this invention is to provide a grey glass (i.e., having a dominant wavelength of from 435 nm to 570 nm) with acceptable solar performance characteristics, where the glass includes a colorant portion having no more than 0.3% erbium oxide ($Er_2O_3$), and no more than 0.7% total iron (expressed as $Fe_2O_3$). In certain example embodiments, the glass may include from 0.2 to 0.6% total iron, and from 0.01 to 0.15% erbium oxide.

In certain example embodiments of this invention, one or more of the above listed objects and/or needs is/are fulfilled by providing a grey glass comprising:

| | |
|---|---|
| total iron (expressed as $Fe_2O_3$) | 0.05 to 0.35% |
| erbium oxide | 0.05 to 0.30% |
| selenium (Se) | <=15 ppm |
| cobalt oxide | 5 to 60 ppm | wherein the grey glass has a redox value ($FeO/Fe_2O_3$) of at least 0.35, a visible transmittance (Lta) of at least 65%, a dominant wavelength in the range of from 435 nm to 570 nm, and an excitation purity (Pe) of no greater than 4.5%.

In other example embodiments of this invention, one or more of the above listed objects and/or needs is/are fulfilled by providing a grey glass comprising:
a base glass portion comprising:

| Ingredient | wt. % |
|---|---|
| $SiO_2$ | 67–75% |
| $Na_2O$ | 10–20% |
| CaO | 5–15% |
| MgO | 0–7% |
| $Al_2O_3$ | 0–7% |
| $K_2O$ | 0–7% | and a colorant portion consisting essentially of, or comprising:

| | |
|---|---|
| total iron (expressed as $Fe_2O_3$) | 0.05 to 0.35% |
| erbium oxide | 0.05 to 0.25% |
| selenium (Se) | <=15 ppm |
| cobalt oxide | 5 to 60 ppm | wherein the grey glass has a redox value ($FeO/Fe_2O_3$) of at least 0.35, a visible transmittance (Lta) of at least 65%, a dominant wavelength in the range of from 435 nm to 570 nm, and an excitation purity (Pe) of no greater than 4.5%.

DETAILED DESCRIPTION OF CERTAIN EXAMPLE EMBODIMENTS OF THIS INVENTION

Grey glasses according to different embodiments of this invention may be used, for example, as windows in the automotive industry (e.g., windshields, backlites, sidelites, etc.), in architectural applications, and in other suitable applications.

Certain glasses according to this invention utilize soda-lime-silica glass as their base composition/glass, to which is added certain ingredients making up a unique colorant portion. An example soda-lime-silica base glass according to certain embodiments of this invention, on a weight percentage basis, includes the following basic ingredients:

TABLE 1

| EXAMPLE BASE GLASS | |
|---|---|
| Ingredient | Wt. % |
| $SiO_2$ | 67–75% |
| $Na_2O$ | 10–20% |
| CaO | 5–15% |
| MgO | 0–7% |
| $Al_2O_3$ | 0–7% |
| $K_2O$ | 0–7% |

Other minor ingredients, including various refining aids, such as salt cake, crystalline water and/or the like may also be included in the base glass. In certain embodiments, for example, glass herein may be made from batch raw materials silica sand, soda ash, dolomite, limestone, with the use of salt cake ($SO_3$) as a refining agent. Reducing agent(s) such as Si (metallic) (Si), silicon monoxide (SiO), sucrose, and/or carbon may also be used. Preferably, soda-lime-silica base glasses herein include by weight from about 10–15% $Na_2O$ and from about 6–12% CaO. While a soda-lime-silica base glass set forth above is preferred in certain embodiments of this invention, this invention is not so limited. Thus, other base glasses (e.g., borosilicate glass) may instead be employed in alternative embodiments.

First Set of Embodiments

To the base glass (e.g., see Table 1 above), in a first set of embodiments of this invention a colorant portion is added which causes the resulting glass to be grey in color (i.e., dominant wavelength of from 435 nm to 570 nm) and achieve desirable solar management properties (e.g., reduced UV and IR transmission coupled with high visible transmission). In certain embodiments of this invention, an example colorant portion that is added to the base glass is substantially free of cerium, nickel, titanium and/or chromium (i.e., no more than about 0.0030% Ce, CeO, and/or $CeO_2$; no more than about 0.0010% Ni and/or NiO; and no more than about 0.01% (more preferably no more than 0.003%, and most preferably no greater than 0.001%) titanium or chromium, including oxides thereof), and is characterized as set forth in Table 2 below (in terms of weight percentage of the total glass composition, or in terms of ppm). The colorant portions in different embodiments of this invention may either comprise the materials in Table 2 below, or consist essentially of the materials in Table 2 below. Herein, the total iron/erbium oxide ratio is defined as the amount of total iron (expressed as $Fe_2O_3$) divided by the total amount of erbium and erbium oxide(s) in the final glass composition (i.e., $Fe_2O_3$/erbium oxide).

TABLE 2

| EXAMPLE COLORANT PORTION FOR FIRST SET OF EMBODIMENTS | | | |
|---|---|---|---|
| Ingredient | Preferred | More Preferred | Most Preferred |
| Total iron (expressed as $Fe_2O_3$): | <=0.35% | 0.05 to 0.29% | 0.10 to 0.28% |
| Erbium oxide (e.g., $Er_2O_3$): | 0 to 0.3% | 0.05 to 0.25% | 0.10 to 0.20% |
| Selenium (Se): | <=15 ppm | <=8 ppm | 2 to 7 ppm |
| Cobalt oxide (e.g., $Co_3O_4$): | 5 to 60 ppm | 12–50 ppm | 15 to 35 ppm |
| % FeO (wt. % spectral): | <=0.2 | <=0.17 | 0.10 to 0.16 |
| Glass Redox ($FeO/Fe_2O_3$): | >=0.35 | >=0.40 | >=0.46 |
| Total iron/erbium oxide ratio: | 1 to 3 | 1.2 to 2.2 | 1.4 to 1.9 |

However, it should be appreciated that small amounts of other materials (e.g., refining aids, melting aids, and/or impurities) may be present in the glass such as chromium, manganese, molybdenum, tin, chlorine, zinc, zirconium, Si, sulfur, fluorine, lithium and strontium, without taking away from the purpose(s) and/or goal(s) of the instant invention.

The aforesaid colorant portion enables grey color to be achieved, while at the same time maintaining satisfactory solar performance properties such as high visible transmission coupled with low IR and/or UV transmission. In particular, in certain example embodiments the colorant portion enables improved IR absorption (a type of solar performance) by having a rather high glass redox; and thus a high amount of IR absorber FeO relative to total iron. However, if the blue color resulting from the high redox (i.e., the relatively high amount of FeO) is not adequately compensated for, then the glass will no longer be grey. Thus, in accordance with certain example embodiments of this invention, erbium (e.g., $Er_2O_3$) is used to compensate for the rather high amount of FeO, so as to bring the color of the glass back into the desired grey region. Thus, it has surprisingly been found in certain example embodiments that the rather high redox (i.e., glass redox >=0.35, more preferably >=0.40, most preferably >=0.46) combined with low total iron (i.e., total iron <=0.35%) and a small amount of erbium (e.g., $Er_2O_3$) and cobalt enables a grey colored glass with satisfactory solar performance to be realized without a need for too much total iron and/or expensive erbium.

In certain example embodiments herein, glasses may be characterized by one or more of the optical characteristics set forth below when measured at a nominal thickness of from 1–6 mm, more preferably from about 3–4 mm (about 3 or 4 mm may be used for a reference thickness in certain example non-limiting embodiments). In Table 3, color values a*, b* and L* are in accordance with Ill. D65, 10 degree observer, as is known in the art.

TABLE 3

EXAMPLE OPTICAL CHARACTERISTICS FOR FIRST SET OF EMBODIMENTS

| Characteristic | Preferred | More Preferred | Most Preferred |
|---|---|---|---|
| Lta (visible transmittance): | >=65% | >=70% | >=74% |
| $IR_{transmission}$ (% IR): | <=50% | <=47% | <=45% |
| % TS: | <=65% | <=60% | <=55% |
| Dominant Wavelength (λ): | 435–570 nm | 470–555 nm | 480–520 nm |
| Excitation Purity (Pe): | <=4.5 | <=3.0 | <=2.5 |
| a* (Ill. D65, 10 deg): | –4 to +4 | –2 to +2 | –1.5 to +1.5 |
| b* (Ill. D65, 10 deg): | –4 to +4 | –2 to +2 | –1.5 to +1.5 |
| L* (Ill. D65, 10 deg.): | 80 to 95 | 84 to 91 | 85 to 90 |

The "grey" color achieved by glasses according to certain example embodiments of this invention is a function of dominant wavelength and excitation purity. Grey glass herein typically has a dominant wavelength of from 435 nm to 570 nm, and an excitation purity (Pe) of no greater than about 4.5%.

The total amount of iron present in the glass, and thus in the colorant portion thereof, is expressed herein in terms of $Fe_2O_3$ in accordance with standard practice. This, however, does not imply that all iron is actually in the form of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass (i.e., glass redox), which is expressed as the ratio $FeO/Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. Iron in the ferrous state ($Fe^{2+}$; FeO) is a blue-green colorant, while iron in the ferric state ($Fe^{3+}$) is a yellow-green colorant. According to certain embodiments of this invention, the colorant portion of the glass composition herein is characterized by a glass redox value (i.e., $FeO/Fe_2O_3$) of at least 0.35, more preferably at least 0.40 and most preferably at least 0.46 as listed above. As previously explained, this rather high glass redox value combined with low total iron and a small amount of erbium and cobalt enables a grey colored glass with satisfactory solar performance to be realized without a need for too much total iron or expensive erbium. It is noted that in different embodiments of this invention iron may be added to the glass batch during the manufacturing process in any suitable form (e.g., via rouge and/or melite).

Glass according to certain embodiments of this invention is often made via the known float process in which a tin bath is utilized. It will thus be appreciated by those skilled in the art that as a result of forming the glass on molten tin in certain example embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

Se (selenium) may or may not be present in the colorant portion in different embodiments. While selenium often combines with iron as iron selenide (FeSe) in glass to produce brown color, selenium is referred to in the colorant portion herein as "Se" which is meant to include, for example, its state as Se as well as its other states in glass such as FeSe.

Cobalt (Co) is a blue colorant. It is believed that much of the cobalt in the glass is in the oxide state of $Co_3O_4$. However, other oxide states of CoO are also possible in glasses according to this invention. Thus, unless expressly stated to the contrary, the terms "cobalt oxide", "CoO" and "$Co_3O_4$" as used herein include not only cobalt in this/these particular oxide state(s), but also include(s) cobalt which may be present in other oxide or non-oxide state(s).

Erbium (Er) is a pink colorant. It is believed that much of the erbium in the glass is in the oxide state of $Er_2O_3$. However, other oxide states of erbium are also possible in glasses according to this invention. Thus, unless expressly stated to the contrary, the terms "erbium oxide" and "$Er_2O_3$" as used herein include not only erbium in this/these particular oxide state(s), but also include(s) erbium which may be present in other oxide or non-oxide state(s). While erbium is preferred in many example embodiments of this invention, it need not be present in all embodiments.

EXAMPLES 1–6

First Set of Embodiments

The glasses of certain example embodiments of this invention may be made from batch ingredients using well known glass melting and refining techniques once given the above final glass analysis. Experimental 100 gm glass melts were made in platinum crucibles using a standard electric melting furnace set-up for soda-lime-silica glass compositions, that is, a melting temperature of about 1500 degrees C., a melting time of about 4 hours in air medium, an annealing temperature of about 620 to 680 degrees C., an annealing time of about 0.5 hours, and a cool down to room temperature by inertia after annealing furnace shut-down. The glass was cast into graphite molds, annealed and cooled down, then ground and polished for visual evaluation and spectral measurements. The batch redox was slightly negative for these example melts. Salt cake (and often crystalline water) was used as refining agents in a known manner. SiO, Si and/or calcumite were used as reducing agents in amounts sufficient to achieve the redox values listed below. The following base glass batch was used for the Examples herein (note: the below-listed ingredients in the batch will add up to 100% by weight once oxides thereof are accounted for; thus, they need not add up to one hundred as raw materials):

TABLE 4

Base Glass for Examples 1-6

| Batch Ingredient for Base Glass | Parts by Wt. % |
|---|---|
| sand | 71.5 |
| soda ash | 23.7 |
| dolomite | 18.32 |
| limestone | 6.1 |

In addition to the base glass materials above, the final glasses of the different Examples herein included the following colorant portions, respectively, in terms of wt. % of the total glass if not indicated otherwise (some materials are in terms of ppm if listed as such). The redox in the table below is the glass redox, as opposed to the batch redox.

TABLE 5

Colorant Portions of Examples 1-6

| Mat'l/Property | Ex. 1 | Ex. 2 | Ex. 3 | Ex. 4 | Ex. 5 | Ex. 6 |
|---|---|---|---|---|---|---|
| total iron (Fe$_2$O$_3$): | 0.28% | 0.27% | 0.26% | 0.26% | 0.3% | 0.28% |
| erbium oxide (e.g., Er$_2$O$_3$): | 0.18% | 0.15% | 0.12% | 0 | 0 | 0 |
| selenium (Se): | 3 ppm | 3 ppm | 4 ppm | 5 ppm | 3 ppm | 4 ppm |
| cobalt oxide (Co$_3$O$_4$) | 19 ppm | 23 ppm | 20 ppm | 22 ppm | 28 ppm | 30 ppm |
| % FeO: | 0.145 | 0.139 | 0.170 | 0.130 | 0.110 | 0.140 |
| Redox (FeO/Fe$_2$O$_3$): | 0.5 | 0.47 | 0.65 | 0.5 | 0.36 | 0.46 |
| Fe$_2$O$_3$/Er$_2$O$_3$ ratio: | 1.55 | 1.8 | 2.16 | n/a | n/a | n/a |

Solar characteristics for the example glasses at about 3.1 mm thickness were as follows, where L*, a* and b* were measured with respect to Ill. D65, 10 degree observer:

TABLE 6

Solar Characteristics of Examples 1-6

| Property | Ex. 1 | Ex. 2 | Ex. 3 | Ex. 4 | Ex. 5 | Ex. 6 |
|---|---|---|---|---|---|---|
| Lta (visible trans. %): | 70.5 | 74.2 | 70 | 71.2 | 73.6 | 69.4 |
| % IR: | 40.29 | 44.5 | 37.2 | 47.6 | 50.1 | 44.5 |
| % TS: | 53.07 | 57.1 | 51.2 | 58.8 | 62.8 | 57.4 |
| L*: | 87.3 | 89.4 | 86.0 | 87.8 | 89.2 | 85.8 |
| a*: | −1.2 | −1.7 | −2 | −2.3 | −3.1 | −1.7 |
| b*: | +0.2 | −1.3 | +0.29 | +0.7 | −1.3 | +1.05 |
| Excit. Purity (Pe %) | 0.57 | 2.1 | 1.04 | 0.81 | 2.8 | 0.97 |
| Dom. Wavelength (nm): | 503 | 487 | 500 | 507 | 489 | 540 |

Second Set of Embodiments

The second set of embodiments of this invention is the same as the first set of embodiments described above, with example exceptions being that lower amounts of erbium may be used, higher amounts of total iron may be used, color limits may be relaxed, and the redox may be different.

The colorant portions for the second set of embodiments may either comprise the materials in Table 7 below, or consist essentially of the materials in Table 7 below.

TABLE 7

EXAMPLE COLORANT PORTION FOR SECOND SET OF EMBODIMENTS

| Ingredient | Preferred | More Preferred | Most Preferred |
|---|---|---|---|
| Total iron (expressed as Fe$_2$O$_3$): | 0.1 to 0.7% | 0.2 to 0.6% | 0.35 to 0.55% |
| Erbium oxide (e.g., Er$_2$O$_3$): | 0 to 0.3% | 0.01 to 0.20% | 0.01 to 0.15% |
| Selenium (Se): | <=15 ppm | <=10 ppm | 2 to 9 ppm |
| Cobalt oxide (e.g., Co$_3$O$_4$) | 5 to 60 ppm | 10–50 ppm | 12 to 35 ppm |
| % FeO (wt. % spectral): | <=0.3 | <=0.25 | 0.10 to 0.2 |
| Glass Redox (FeO/Fe$_2$O$_3$): | >=0.25 | >=0.27 | >=0.3 |

However, it should be appreciated that small amounts of other materials (e.g., refining aids, melting aids, and/or impurities) may be present in the glass such as chromium, manganese, molybdenum, tin, chlorine, zinc, zirconium, Si, sulfur, fluorine, lithium and strontium, without taking away from the purpose(s) and/or goal(s) of the instant invention.

The aforesaid colorant portion enables grey color to be achieved, while at the same time maintaining satisfactory solar performance properties such as high visible transmission coupled with low IR and/or UV transmission. Thus, it has surprisingly been found in certain example embodiments that the rather high redox (i.e., glass redox >=0.25, more preferably >=0.27, most preferably >=0.3) combined with total iron and optionally a small amount of erbium (e.g., Er$_2$O$_3$), Se and/or Co enables a grey colored glass with satisfactory solar performance to be realized without a need for too much total iron and/or expensive erbium.

In certain example embodiments herein, glasses may be characterized by one or more of the optical characteristics set forth below when measured at a nominal thickness of from 1–6 mm, more preferably from about 3–4 mm (about 3 or 4 mm may be used for a reference thickness in certain example non-limiting embodiments). In Table 8, color values a*, b* and L* are in accordance with Ill. D65, 10 degree observer, as is known in the art.

TABLE 8

EXAMPLE OPTICAL CHARACTERISTICS FOR SECOND SET OF EMBODIMENTS

| Characteristic | Preferred | More Preferred | Most Preferred |
|---|---|---|---|
| Lta (visible transmittance): | >=65% | >=70% | >=72% |
| IR$_{transmission}$ (% IR): | <=45% | <=35% | <=31% |
| % TS: | <=60% | <=55% | <=50% |
| Dominant Wavelength (λ): | 435–570 nm | 470–555 nm | 480–540 nm |
| Excitation Purity (Pe): | <=4.5 | <=3.0 | <=2.5 |
| a* (Ill. D65, 10 deg): | −4 to +4 | −3 to +2 | −3 to +1 |
| b* (Ill. D65, 10 deg): | −4 to +4 | −3 to +2 | −2 to +1.5 |
| L* (Ill. D65, 10 deg.): | 80 to 95 | 84 to 91 | 85 to 90 |

The "grey" color achieved by glasses according to certain example second set of embodiments of this invention is a function of dominant wavelength and excitation purity. Grey glass herein typically has a dominant wavelength of from 435 nm to 570 nm, and an excitation purity (Pe) of no greater than about 4.5%.

EXAMPLES 7–11

Second Set of Embodiments

The glasses of certain example embodiments of this invention may be made from batch ingredients using well known glass melting and refining techniques once given the above final glass analysis. Experimental 100 gm glass melts were made in platinum crucibles using a standard electric melting furnace set-up for soda-lime-silica glass compositions, that is, a melting temperature of about 1500 degrees C., a melting time of about 4 hours in air medium, an annealing temperature of about 620 to 680 degrees C., an annealing time of about 0.5 hours, and a cool down to room temperature by inertia after annealing furnace shut-down. The glass was cast into graphite molds, annealed and cooled down, then ground and polished for visual evaluation and spectral measurements. The batch redox was from +4 to +8 (broader range is from +2 to +15) for these example melts. Iron was added in the form of rouge for these examples. conventional refining agents were used in a known manner. The following base glass batch was used for Examples 7–11 herein (note: the below-listed ingredients in the batch will add up to 100% by weight once oxides thereof are accounted for; thus, they need not add up to one hundred as raw materials):

TABLE 9

Base Glass for Examples 7–11

| Batch Ingredient for Base Glass | Parts by Wt. % |
| --- | --- |
| sand | 71.5 |
| soda ash | 23.7 |
| dolomite | 18.32 |
| limestone | 6.1 |

In addition to the base glass materials above, the final glasses of the different Examples 7–11 herein included the following colorant portions, respectively, in terms of wt. % of the total glass if not indicated otherwise (some materials are in terms of ppm if listed as such). The redox in the table below is the glass redox, as opposed to the batch redox.

TABLE 10

Colorant Portions of Examples 7–11

| Mat'l/Property | Ex. 7 | Ex. 8 | Ex. 9 | Ex. 10 | Ex. 11 |
| --- | --- | --- | --- | --- | --- |
| total iron ($Fe_2O_3$): | 0.6% | 0.55% | 0.50% | 0.53% | 0.48% |
| erbium oxide (e.g., $Er_2O_3$): | 0 | 0 | 0.01% | 0.05% | 0.1 |
| selenium (Se): | 8 ppm | 3 ppm | 5 ppm | 4 ppm | 5 ppm |
| cobalt oxide ($Co_3O_4$): | 30 ppm | 20 ppm | 19 ppm | 15 ppm | 19 ppm |
| % FeO (spectral): | 0.18 | 0.18 | 0.16 | 0.16 | 0.18 |
| Redox (FeO/$Fe_2O_3$): | 0.3 | 0.33 | 0.32 | 0.33 | 0.34 |

Solar characteristics for these example glasses at about 3.1 mm thickness were as follows, where L*, a* and b* were measured with respect to Ill. D65, 10 degree observer:

TABLE 11

Solar Characteristics of Examples 7–11

| Property | Ex. 7 | Ex. 8 | Ex. 9 | Ex. 10 | Ex. 11 |
| --- | --- | --- | --- | --- | --- |
| Lta (visible trans. %): | 70.8 | 70.7 | 70.3 | 72.08 | 71 |
| % IR: | 25.4 | 26.1 | 29.1 | 24.06 | 26.2 |
| % TS: | 46.1 | 47.1 | 48.5 | 44.6 | 47.4 |
| L*: | 86.1 | 88.9 | 87.7 | 87.39 | 88.7 |
| a*: | −2.9 | −2.6 | −2 | −3.18 | −2.9 |
| b*: | 1.5 | 0.85 | 1.4 | −1.4 | −0.43 |
| Excit. Purity (Pe %): | 1.25 | 0.66 | 1.32 | 2.78 | 2.93 |
| Dom. Wavelength (nm): | 514 | 513 | 538 | 488 | 493 |

Terms used herein are known in the glass art. For example, luminous transmittance (Lta) (2 degree observer) is understood in the art, and is used herein in accordance with its known meaning. This term is also known as Ill. A visible transmittance (380–780 nanometers inclusive), and its measurements are made in accordance with CIE Publication 15.2 (1986)). The terms, and characteristics, of ultraviolet light transmittance (% UV), infrared energy transmittance (% IR), dominant wavelength (DW) and excitation purity (i.e. % "purity", or Pe) are also well understood terms in the art, as are their measurement techniques. Such terms are used herein, in accordance with their well known meaning, e.g., see U.S. Pat. No. 5,308,805. In particular, ultraviolet transmittance (% UV) is measured herein using Parry Moon Air Mass=2 (300–400 nm inclusive, integrated using Simpson's Rule at 10 nm intervals). IR transmittance is conventionally measured using Simpson's Rule and Parry Moon Air Mass=2 over the wavelength range 800–2100 nm inclusive at 50 nm intervals. Dominant wavelength (DW) is calculated and measured conventionally in accord with the aforesaid CIE Publication 15.2 (1986) and ASTM: E 308-90. The term "dominant wavelength" includes both the actual measured wavelength and, where applicable, its calculated complement. Excitation purity (Pe or % "purity") is measured conventionally in accordance with CIE Publication 15.2 (1986) and ASTM: E 308-90.

Once given the above disclosure many other features, modifications and improvements will become apparent to the skilled artisan. Such features, modifications and improvements are therefore considered to be a part of this invention, the scope of which is to be determined by the following claims:

What is claimed is:

1. A grey glass comprising:
   a base glass portion comprising:

| Ingredient | wt. % |
| --- | --- |
| $SiO_2$ | 67–75% |
| $Na_2O$ | 10–20% |
| CaO | 5–15% |
| MgO | 0–7% |
| $Al_2O_3$ | 0–7% |
| $K_2O$ | 0–7% | and a colorant portion consisting essentially of:

| | |
|---|---|
| total iron (expressed as Fe$_2$O$_3$) | 0.05 to 0.35% |
| erbium oxide | 0.05 to 0.25% |
| selenium (Se) | <=15 ppm |
| cobalt oxide | 5 to 60 ppm | wherein the grey glass has a redox value (FeO/Fe$_2$O$_3$) of at least 0.35, a visible transmittance (Lta) of at least 65%, a dominant wavelength in the range of from 435 nm to 570 nm, and an excitation purity (Pe) of no greater than 4.5%.

2. The glass of claim 1, wherein the glass has a dominant wavelength of from 470 to 555 nm, and an excitation purity (Pe) of no greater than 3.0%.

3. The glass of claim 2, wherein said dominant wavelength and excitation purity are measured at a nominal thickness of the glass of anywhere from 3 mm to 4 mm, and wherein the glass has a dominant wavelength of from 480 to 520 nm and an excitation purity (Pe) of no greater than 2.5%.

4. The glass of claim 1, wherein the glass is substantially free of cerium, nickel, titanium and chromium.

5. The glass of claim 1, wherein the glass has a redox value (FeO/Fe$_2$O$_3$) of at least 0.40.

6. The glass of claim 1, wherein the glass has a redox (FeO/Fe$_2$O$_3$) of at least 0.46.

7. The glass of claim 1, wherein said colorant portion consists essentially of:

| | |
|---|---|
| total iron (expressed as Fe$_2$O$_3$) | 0.05 to 0.29% |
| erbium oxide | 0.05 to 0.25% |
| selenium (Se) | <=15 ppm |
| cobalt oxide | 12 to 50 ppm. |

8. The glass of claim 1, wherein the glass has a visible transmission Lta of at least about 70%.

9. The glass of claim 1, wherein said colorant portion consists essentially of:

| | |
|---|---|
| total iron (expressed as Fe$_2$O$_3$) | 0.10 to 0.28% |
| erbium oxide | 0.10 to 0.20% |
| selenium (Se) | <=8 ppm |
| cobalt oxide | 15 to 35 ppm. |

10. The glass of claim 1, wherein the glass has an IR % transmission of no greater than 50%.

11. The glass of claim 1, wherein the glass has an IR % transmission of no greater than 47%, and a TS % of from 45 to 60%.

12. The glass of claim 1, wherein the glass has a color characterized as follows when measured according to Ill. D65, 10 degree observer:

| | |
|---|---|
| a* | from −2 to +1 |
| b* | from −2 to +2 |
| L* | from 80 to 95. |

13. A grey glass comprising:
a base glass portion comprising:

| Ingredient | wt. % |
|---|---|
| SiO$_2$ | 67–75% |
| Na$_2$O | 10–20% |
| CaO | 5–15% |
| MgO | 0–7% |
| Al$_2$O$_3$ | 0–7% |
| K$_2$O | 0–7% | and a colorant portion comprising:

| | |
|---|---|
| total iron (expressed as Fe$_2$O$_3$) | 0.05 to 0.35% |
| erbium oxide | 0.05 to 0.25% |
| selenium (Se) | <=15 ppm |
| cobalt oxide | 5 to 60 ppm | wherein the grey glass has a redox value (FeO/Fe$_2$O$_3$) of at least 0.35, a visible transmittance (Lta) of at least 65%, a dominant wavelength in the range of from 435 nm to 570 nm, and an excitation purity (Pe) of no greater than 4.5%.

14. The glass of claim 13, wherein the glass has a dominant wavelength of from 470 to 555 nm, and an excitation purity (Pe) of no greater than 3.0%.

15. The glass of claim 14, wherein said dominant wavelength and excitation purity are measured at a nominal thickness of the glass of anywhere from 3 mm to 4 mm, and wherein the glass has a dominant wavelength of from 480 to 520 nm and an excitation purity (Pe) of no greater than 2.5%.

16. The glass of claim 13, wherein the glass is substantially free of at least three of cerium, nickel, titanium and chromium.

17. The glass of claim 13, wherein the glass has a redox (FeO/Fe$_2$O$_3$) of at least 0.40.

18. The glass of claim 13, wherein the glass has a redox (FeO/Fe$_2$O$_3$) of at least 0.46.

19. The glass of claim 13, wherein said colorant portion comprises:

| | |
|---|---|
| total iron (expressed as Fe$_2$O$_3$) | 0.05 to 0.29% |
| erbium oxide | 0.05 to 0.25% |
| selenium (Se) | 2 to 7 ppm |
| cobalt oxide | 12 to 50 ppm. |

20. The glass of claim 13, wherein the glass has a visible transmission Lta of at least about 70%.

21. The glass of claim 13, wherein said colorant portion comprises:

| | |
|---|---|
| total iron (expressed as Fe$_2$O$_3$) | 0.10 to 0.28% |
| erbium oxide | 0.10 to 0.20% |
| selenium (Se) | 2 to 7 ppm |
| cobalt oxide | 15 to 35 ppm. |

22. The glass of claim 13, wherein the glass has an IR % transmission of no greater than 50%.

23. The glass of claim 13, wherein the glass has an IR % transmission of no greater than 47%, and a TS % of from 45 to 60%.

24. The glass of claim 13, wherein the glass has a color characterized as follows when measured according to Ill. D65, 10 degree observer:

| | |
|---|---|
| a* | from −2 to +1 |
| b* | from −2 to +2 |
| L* | from 80 to 95. |

25. A glass comprising:

| | |
|---|---|
| total iron (expressed as $Fe_2O_3$) | 0.05 to 0.35% |
| erbium oxide | 0.05 to 0.30% |
| selenium (Se) | <=15 ppm |
| cobalt oxide | 5 to 60 ppm | wherein the glass has a redox value ($FeO/Fe_2O_3$) of at least 0.35, a visible transmittance (Lta) of at least 65%, a dominant wavelength in the range of from 435 nm to 570 nm, and an excitation purity (Pe) of no greater than 4.5%.

26. The glass of claim 25, wherein the glass has a redox value ($FeO/Fe_2O_3$) of at least 0.40, a visible transmittance (Lta) of at least 70%, and an excitation purity (Pe) of no greater than 3%.

27. A grey glass comprising:

| | |
|---|---|
| total iron (expressed as $Fe_2O_3$) | 0.05 to 0.29% |
| erbium oxide | 0 to 0.30% |
| selenium (Se) | <=15 ppm |
| cobalt oxide | 5 to 60 ppm | wherein the grey glass has a redox value ($FeO/Fe_2O_3$) of at least 0.40, a visible transmittance (Lta) of at least 65%, a dominant wavelength in the range of from 470 nm to 555 nm, an excitation purity (Pe) no greater than 4.5%, and wherein the glass has a color characterized as follows when measured according to Ill. D65, 10 degree observer:

| | |
|---|---|
| a* | from −2 to +1 |
| b* | from −2 to +2 |
| L* | from 80 to 95. |

28. The glass of claim 27, wherein the glass has a redox value ($FeO/Fe_2O_3$) of at least 0.46, a visible transmittance (Lta) of at least 70%, and an excitation purity (Pe) of no greater than 3%.

29. The glass of claim 27, wherein the glass has color characterized as follows when measured according to Ill. D65, 10 degree observer:

| | |
|---|---|
| a* | from −2 to 0 |
| b* | from −1.5 to +1.5 |
| L* | from 84 to 91. |

30. The glass of claim 27, wherein the glass includes no more than 0.003% titanium oxide and no more than 0.003% chromium oxide.

31. The glass of claim 27, wherein the glass comprises from 0.05 to 0.25% erbium oxide, and from 12 to 50 ppm cobalt oxide.

32. The glass of claim 27, wherein the glass comprises from 2 to 7 ppm Se.

33. Grey glass comprising:

| | |
|---|---|
| total iron (expressed as $Fe_2O_3$) | 0.05 to 0.35% |
| erbium oxide | 0 to 0.30% |
| cobalt oxide | 5 to 60 ppm | wherein the grey glass has a redox value ($FeO/Fe_2O_3$) of at least 0.40, a visible transmittance (Lta) of at least 65%, a dominant wavelength in the range of from 470 nm to 555 nm, and wherein the glass has a color characterized as follows when measured according to Ill. D65, 10 degree observer:

| | |
|---|---|
| a* | from −4 to +4 |
| b* | from −1.5 to +1.5 |

34. The grey glass of claim 32, wherein the glass comprises from 2 to 7 ppm Se.

35. Grey glass comprising:

| | |
|---|---|
| total iron (expressed as $Fe_2O_3$) | 0.05 to 0.35% |
| erbium oxide | <=0.30% |
| cobalt oxide | 5 to 60 ppm | wherein the grey glass has a redox value ($FeO/Fe_2O_3$) of at least 0.35, a visible transmittance (Lta) of at least 65%, an JR transmission of no greater than 50%, and a dominant wavelength in the range of from 435 nm to 570 nm, and wherein the glass further comprises from 0.10 to 0.20% erbium oxide.

36. The grey glass of claim 35, wherein the glass has an JR transmission of no greater than 45%.

37. The grey glass of claim 35, wherein the glass comprises from 2 to 7 ppm Se.

38. A grey glass including a base glass portion comprising:

| Ingredient | wt. % |
|---|---|
| $SiO_2$ | 67–75% |
| $Na_2O$ | 10–20% |
| CaO | 5–15% |
| MgO | 0–7% |
| $Al_2O_3$ | 0–7% |
| $K_2O$ | 0–7% | and a colorant portion comprising:

| | |
|---|---|
| total iron (expressed as $Fe_2O_3$) | 0.1 to .7% |
| erbium oxide | 0.01 to 0.3% |
| selenium (Se) | 2 to 15 ppm |
| cobalt oxide | 5 to 60 ppm | wherein the grey glass has a redox value ($FeO/Fe_2O_3$) of at least 0.25, a visible transmittance (Lta) of at least 65%, a dominant wavelength in the range of from 435 nm to 570 nm, and an excitation purity (Pe) of no greater than 4.5%.

39. The glass of claim 38, wherein the glass has a dominant wavelength of from 480 to 540 nm, and an excitation purity (Pe) of no greater than 3.0%.

40. The glass of claim 38, wherein said dominant wavelength and excitation purity are measured at a nominal thickness of the glass of anywhere from 3 mm to 4 mm, and wherein the glass has a dominant wavelength of from 480 to 520 nm and an excitation purity (Pe) of no greater than 2.5%.

41. The glass of claim 38, wherein the glass is substantially free of at least three of cerium, nickel, titanium and chromium.

42. The glass of claim 38, wherein the glass has a redox ($FeO/Fe_2O_3$) of at least 0.27.

43. The glass of claim 38, wherein said colorant portion comprises:

| | |
|---|---|
| total iron (expressed as $Fe_2O_3$) | 0.35 to 0.55% |
| erbium oxide | 0.01 to 0.15% |
| selenium (Se) | 2 to 9 ppm |
| cobalt oxide | 10 to 50 ppm. |

44. The glass of claim 38, wherein the glass has a visible transmission Lta of at least about 70%, and an IR % transmission of no greater than 31%.

45. The glass of claim 12, wherein the glass has an IR % transmission of no greater than 35%, and a TS % of no greater than 50%.

46. A glass comprising:

| | |
|---|---|
| total iron (expressed as $Fe_2O_3$) | 0.1 to .7% |
| erbium oxide | 0.01 to 0.30% |
| selenium (Se) | 2–15 ppm |
| cobalt oxide | 5–60 ppm | wherein the glass has a redox value ($FeO/Fe_2O_3$) of at least 0.25, a visible transmittance (Lta) of at least 65%, a dominant wavelength in the range of from 435 nm to 570 nm, an excitation purity (Pe) of no greater than 4.5%, and a % IR transmission of no greater than 31%.

47. A grey glass including a base glass portion comprising:

| Ingredient | wt. % |
|---|---|
| $SiO_2$ | 67–75% |
| $Na_2O$ | 10–20% |
| CaO | 5–15% |
| MgO | 0–7% |
| $Al_2O_3$ | 0–7% |
| $K_2O$ | 0–7% | and a colorant portion consisting essentially of:

| | |
|---|---|
| total iron (expressed as $Fe_2O_3$) | 0.1 to .7% |
| erbium oxide | 0.01 to 0.3% |
| selenium (Se) | 2 to 15 ppm |
| cobalt oxide | 5 to 60 ppm | wherein the grey glass has a redox value ($FeO/Fe_2O_3$) of at least 0.25, a visible transmittance (Lta) of at least 65%, a dominant wavelength in the range of from 435 nm to 570 nm, and an excitation purity (Pe) of no greater than 4.5%.

* * * * *